(12) United States Patent
Sumiya

(10) Patent No.: US 7,800,662 B2
(45) Date of Patent: Sep. 21, 2010

(54) IMAGING SYSTEM AND PIXEL DEFECT CORRECTION DEVICE

(75) Inventor: Akinori Sumiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 11/869,442

(22) Filed: Oct. 9, 2007

(65) Prior Publication Data

US 2008/0106619 A1    May 8, 2008

(30) Foreign Application Priority Data

Oct. 13, 2006  (JP)  ............................ P2006-279963
Jan. 29, 2007  (JP)  ............................ P2007-017884

(51) Int. Cl.
*H04N 9/64* (2006.01)
*G06K 9/40* (2006.01)

(52) U.S. Cl. ...................... 348/246; 382/275
(58) Field of Classification Search ................. 348/241, 348/246, 247; 382/275
See application file for complete search history.

(56) References Cited

U.S. PATENT DOCUMENTS

| 6,795,118 B1 * | 9/2004 | Cho ........................... 348/246 |
| 6,995,794 B2 * | 2/2006 | Hsu et al. ................... 348/241 |
| 7,009,644 B1 * | 3/2006 | Sanchez et al. ............. 348/247 |
| 7,365,783 B2 * | 4/2008 | Hashimoto et al. .......... 348/246 |

* cited by examiner

*Primary Examiner*—Sinh Tran
*Assistant Examiner*—Daniel M Pasiewicz
(74) *Attorney, Agent, or Firm*—Sonnenschein Nath & Rosenthal LLP

(57) ABSTRACT

Disclosed herein is an imaging system including: an imaging device; light blocking means for blocking a light receiving section of the imaging device from light; a pixel defect correction section configured to detect and correct defective pixels of the imaging device; a signal processing section configured to process a pixel signal corrected by the pixel defect correction section; and control means for controlling the signal processing section and the light blocking means according to information obtained by the pixel defect correction section; wherein the pixel defect correction section has timing means and measures an operating time with the timing means to estimate a secondary defect count.

7 Claims, 7 Drawing Sheets

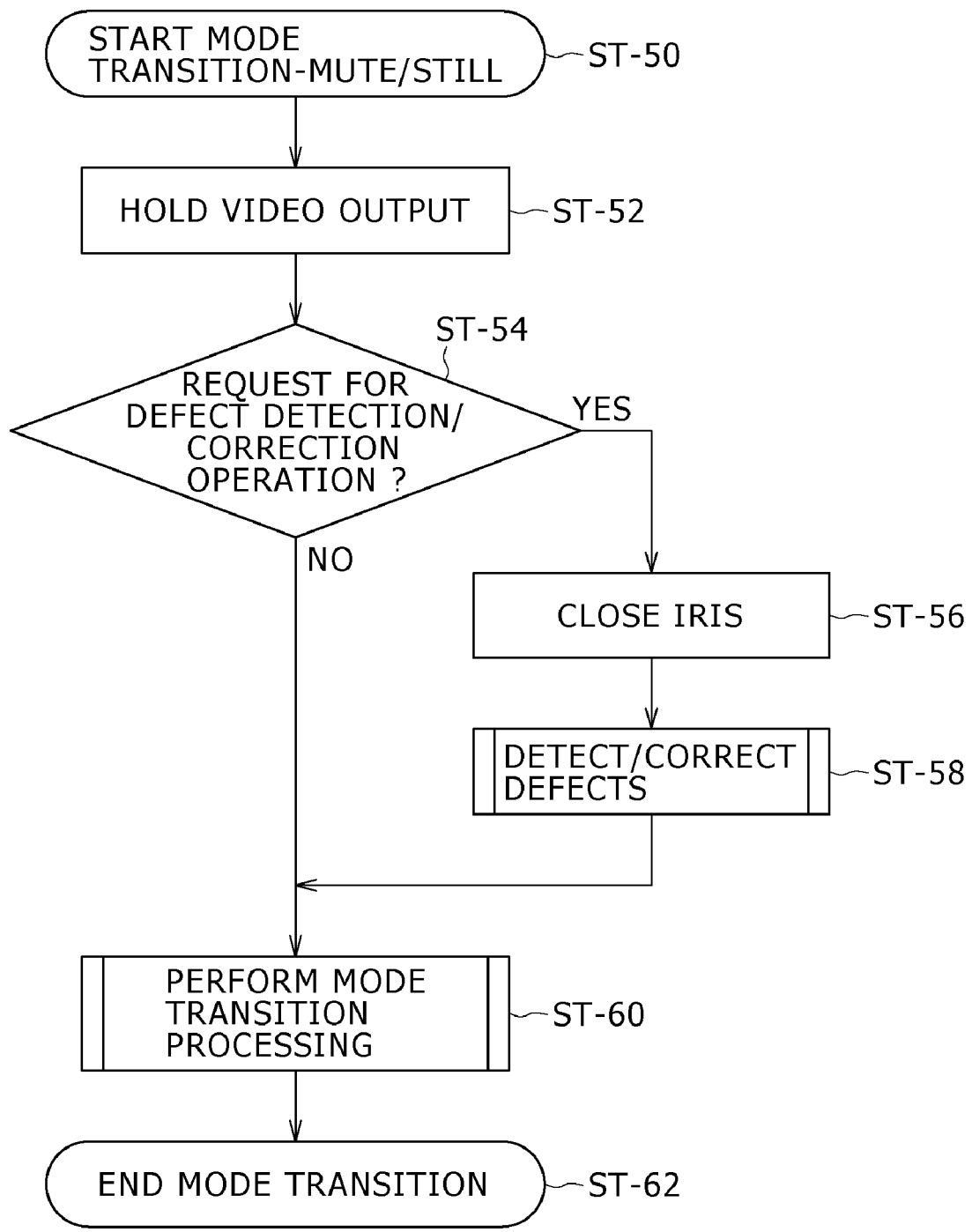

IMAGING SYSTEM AND PIXEL DEFECT CORRECTION DEVICE

CROSS REFERENCES TO RELATED APPLICATIONS

The present invention contains subject matter related to Japanese Patent Application JP 2006-279963 filed with the Japan Patent Office on Oct. 13, 2006 and Japanese Patent Application JP 2007-017884 filed with the Japan Patent Office on Jan. 29, 2007, the entire contents of which being incorporated herein by reference.

BACKGROUND OF THE INVENTION

1. Field of the Invention

The present invention relates to a pixel defect correction device using a solid-state imaging device (element) and an imaging system using the same.

2. Description of the Related Art

Pixel defects in a CCD (Charge Coupled Device), CMOS (Complementary Metal Oxide Semiconductor) or other solid-state imaging device (element), or an imaging system (also described as a "camera apparatus") using the same, can be classified into two types; crystal defects occurring before the shipment as in the manufacturing process and secondary defects which occur after the shipment. Various defect correction methods have been proposed to prevent image deterioration caused by these defects.

For example, secondary defects which may develop after shipment of a solid-state imaging device (element) or imaging system are on the rise as a result of higher pixel densities achieved in solid-state imaging devices (elements). Therefore, dynamic defect detection and correction methods are popular as there are no limitations to the correction count.

In a dynamic defect detection or correction of a solid-state imaging device (element) or imaging system, however, discrimination between high frequency components and pixel defects involves considerable difficulties. As a result, a high frequency component may be mistaken for a defect. Such a determination leads to overcorrection, erroneously eliminating a line or point which should exist from the image if such a letter or point contains a high frequency component.

For defect correction of a solid-state imaging device (element) or imaging system, it is common, at the time of shipment, to clamp the luminance level and perform detection and correction statically with light completely blocked or light of a given luminance admitted because this suppresses erroneous detection or correction.

For secondary defects of a solid-state imaging device (element) or imaging system, it is common to perform dynamic detection and correction without limiting a correction count because of secondary defects on the rise as a result of higher pixel densities achieved. Moreover, setup change or readjustment after the installation is difficult depending on the installation location of the imaging system.

SUMMARY OF THE INVENTION

Adjustments such as defect detection and correction at power-on have been a prerequisite for product shipment. In monitoring imaging and other systems, however, setup change or readjustment after the installation is difficult depending on the installation location. As a result, second defects at the time of shipment or after the installation may not be dealt with. Further, higher pixel densities achieved in solid-state imaging devices (elements) have led to an increased pixel count. This in turn has resulted in a growing number of secondary defects. Thus, it is becoming common to correct secondary defects through dynamic defect detection and correction which unlimited in terms of a correction count. In dynamic defect detection and correction, however, discrimination between high frequency components and pixel defects involves difficulties. As a result, a high frequency component may be mistaken for a defect. This leads to overcorrection, erroneously eliminating a line or point which should exist if it contains a high frequency component and making it impossible to visually identify the line or point. Further, if that line or point is a feature point of the subject, the image will become corrupted.

Defect detection and correction as necessary during image capture or reproduction, on the other hand, results in a corrupted display image as this corrects defective pixels of the on-screen image.

A solid-state imaging device may develop secondary defects after its shipment or the shipment of an imaging system (camera apparatus) incorporating the imaging device. In light of the above, it is desire of the present invention to properly restrict overcorrection. To achieve this desire, according to the present embodiment, the operating time of a solid-state imaging device or an imaging system (camera apparatus) using the same is measured with a timer counter (timing section). More specifically, the operating time from the moment of static detection or correction of secondary defects is measured. Next, a secondary defect count distribution is calculated based on the defect rate of the solid-state imaging device and the imaging system and its operating time. Then, an overcorrection determination threshold value is set for the calculated secondary defect count distribution. Finally, a setting such as market defect rate is assigned to determine an appropriate correction count, thus properly restricting overcorrection. It is another desire of the present invention to perform static defect correction when defect correction will not affect the on-screen image as when there is no need to record images at given time intervals or during image loading.

An imaging system of the present invention includes an imaging device, light blocking means for blocking a light receiving section of the imaging device from light, and a pixel defect correction section configured to detect and correct secondary defects of the imaging device. The imaging system further includes a signal processing section configured to process a pixel signal corrected by the pixel defect correction section and control means for controlling the signal processing section and the light blocking means according to pixel defect information obtained by the pixel defect correction section. The pixel defect correction section includes timing means and measures an operating time with the timing means to estimate a secondary defect count.

An imaging system of the present invention includes an imaging device, light blocking means for blocking a light receiving section of the imaging device from light, and a pixel defect detection/correction section configured to detect and correct defective pixels associated with an image obtained by the light receiving section. The imaging system further includes a signal processing section configured to process a pixel signal corrected by the pixel defect detection/correction section and output a video signal. The imaging system still further includes control means for obtaining video motion information by finding the stability of the video signal from the signal processing section, blocking the imaging device from light by controlling the light blocking means according to the change in video, and detecting and correcting defective pixels with the imaging device blocked from light.

A pixel defect detection/correction device of the present invention includes pixel defect detection means for being supplied with a pixel signal, detecting defects of the pixel signal, and measuring a defect count. The pixel defect detection/correction device further includes timing means. The pixel defect detection/correction device still further includes an overcorrection calculation section. The overcorrection calculation section compares a measured value of the pixel defect detection means with an estimated value of the pixel signal after the elapse of a predetermined time measured by the timing means. By doing so, the same section determines whether the defect correction is an overcorrection. If so, the same section generates a control signal to correct the defective pixels. The pixel defect detection/correction device corrects defects of the pixel signal with the control signal from the overcorrection calculation section.

A pixel defect detection/correction device of the present invention includes pixel defect detection means for being supplied with a pixel signal, detecting defects of the pixel signal, and measuring a defect count. The pixel defect detection/correction device further includes an overcorrection calculation section. The overcorrection calculation section compares a detected value of the pixel defect detection means with an estimated defect count of the pixel signal after the elapse of a predetermined time measured by timing means. By doing so, the same section determines whether the defect correction is an overcorrection. If so, the same section generates a control signal to correct the defective pixels. The pixel defect detection/correction device still further includes motion information detection means for detecting the stability of a video signal formed by the pixel signal and generating a control signal to perform defect detection and correction according to the change in video. The pixel defect detection/correction device still further includes a controller configured to control the operation of the pixel defect detection means and the overcorrection calculation section based on the control signal from the motion information detection means so as to detect and correct the defective pixels during a predetermined period according to the change in video.

According to the present embodiment, an operating time is measured by timing means from the moment of detection or correction of defects in an imaging system. Next, a secondary defect count distribution of an imaging device is calculated based on its defect rate and operating time. Then, an overcorrection determination threshold value is set for the calculated secondary defect count distribution. Finally, a setting such as market defect rate is assigned to determine an appropriate correction count, thus properly restricting overcorrection. Further, this overcorrection is carried out without corrupting the on-screen image.

A pixel defect correction device and imaging system of the present invention calculates an appropriate defective pixel count in an elapsed time, thus suppressing overcorrection. The pixel defect rate varies depending on the installation location of the imaging system. However, use of a defect rate and threshold value for overcorrection determination makes it possible to suppress overcorrection properly according to the location of use.

The pixel defect correction device and imaging system of the present invention do not require complicated circuitry or control for determination of overcorrection. Even if the imaging device is installed where readjustment is difficult, it can be readjusted at a proper time thanks to information issued following overcorrection. Once installed, the imaging system does not require readjustment of its defect detection and correction. The imaging equipment is capable of self-recovery by itself.

Further, correction operation can be performed without corrupting the on-screen image.

BRIEF DESCRIPTION OF THE DRAWINGS

FIG. 8 is a flowchart for describing the operation of the imaging system illustrated in FIG. 6.

DETAILED DESCRIPTION OF THE PREFERRED EMBODIMENT

Figure 1:
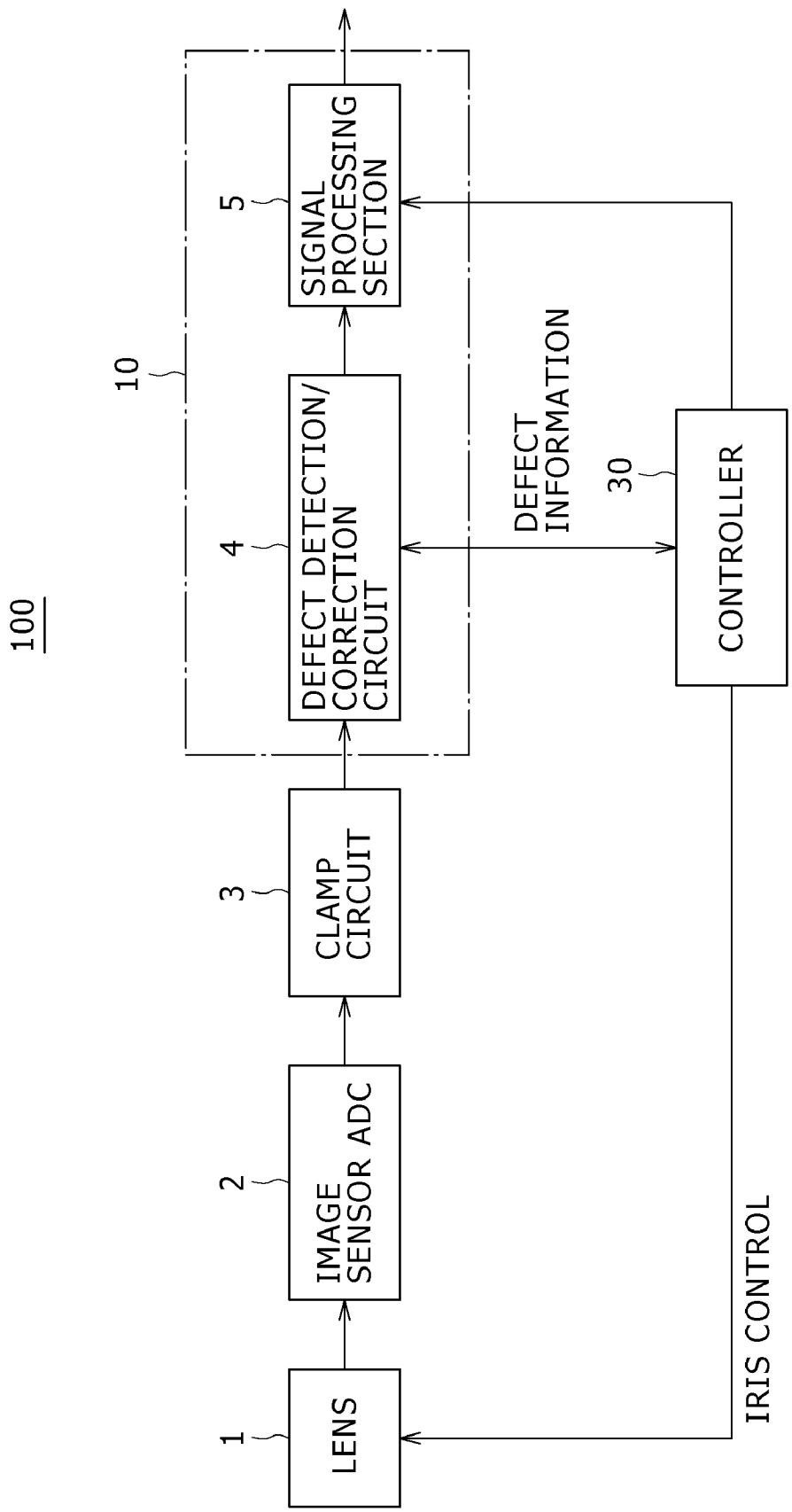
FIG. 1 is a block configuration diagram of an imaging system.

FIG. 1 illustrates a schematic configuration diagram of an imaging system (camera apparatus) 100 according to an embodiment of the present invention. The imaging system 100 includes a lens 1, an image sensor ADC (analog/digital converter) 2, a clamp circuit 3, a digital signal processing section 10, a controller 30 and other components.

The lens 1 has an iris (light blocking section) mechanism which is not shown in FIG. 1. The iris mechanism is controlled by an iris control signal from the controller 30.

The image sensor ADC 2 includes not only a solid-state imaging device but also an S/H (sample hold) circuit, an AGC (auto gain control) circuit, an ADC converter and other components.

Figure 2:
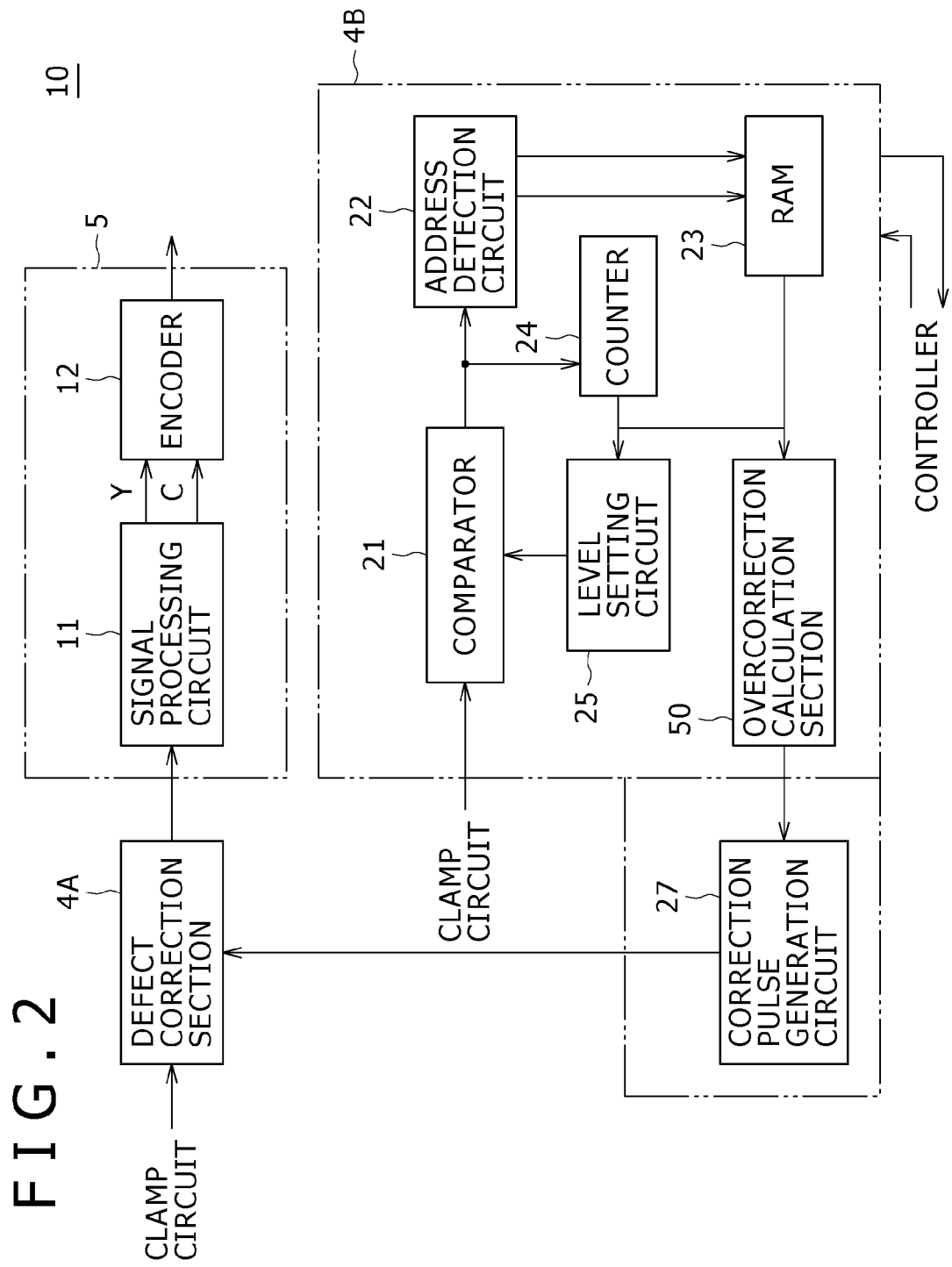
FIG. 2 is a block configuration diagram of a digital signal processing section illustrated in FIG. 1.

The digital signal processing section 10 includes a defect detection/correction circuit 4 and a signal processing section 5. Further, the defect detection/correction circuit 4 includes a defect correction section 4A and a defect detection section 4B as illustrated in FIG. 2. The signal processing section 5 includes a signal processing circuit 11, an encoder 12 and other components.

The controller 30 includes control circuits, a microcomputer and other components. For example, the microcomputer controls the operation of the lens 1's iris, and the defect detection/correction circuit 4 and the signal processing section 5 of the digital signal processing section 10.

In addition to the above, a timing generator which is not shown in FIGS. 1 and 2 generates control signals including horizontal and vertical clock signals with reference to a system clock, thus driving the image sensor ADC 2 and the digital signal processing section 10 at predetermined timings.

In the imaging system 100 configured as described above, the lens 1 forms the image of a subject not shown in FIG. 1 on the imaging surface of the image sensor ADC 2. A solid-state imaging device such as CCD or CMOS imaging device is generally used for the image sensor ADC 2. The image sensor (ADC) 2 converts the image formed on its imaging surface into an electric signal on a pixel-by-pixel basis and supplies this signal as an imaging signal to an S/H & AGC circuit which is not shown in FIGS. 1 and 2.

The S/H & AGC circuit samples and holds an imaging signal from the solid-state imaging device of the image sensor ADC 2 to extract necessary data. At the same time, the S/H &

AGC circuit regulates the gain of the imaging signal to adjust it to a proper level. The output signal of the S/H & AGC circuit is supplied to the A/D converter.

The A/D converter converts the output signal of the S/H & AGC circuit from analog to digital to the clamp circuit 3. The A/D converter supplies, for example, 10-bit data to the clamp circuit 3.

The clamp circuit 3 clamps the black level of the imaging signal in digital form at a predetermined voltage level first and then supplies the signal to the digital signal processing section 10.

The digital signal processing section 10 supplies the digital data from the A/D converter to the defect detection/correction circuit 4.

The defect detection/correction circuit 4 making up the main part of a pixel defect correction device includes the defect correction section 4A and the defect detection section 4B as illustrated in FIG. 2. The defect correction section 4A corrects defective pixels using a correction pulse from a correction pulse generation circuit 27. On the other hand, an overcorrection calculation section 50 of the defect detection section 4B suppresses overcorrection on defective pixels. Based on defective pixel address data resulting from overcorrection suppression, the correction pulse generation circuit 27 generates a correction pulse which is supplied to the defect correction section 4A. Overcorrected defective pixels are corrected by the defect correction section 4A. The overcorrection calculation section 50 may include software and be implemented by causing the controller to write address data back to a RAM 23 which stores defective pixel addresses.

Defective pixels are corrected by correcting pixel values by one of the publicly known interpolation methods. In one of the methods, the pixel of interest is replaced by the immediately preceding pixel or the pixel before the immediately preceding pixel in real time. In another method, the pixel of interest is replaced by the mean value of the immediately preceding and succeeding pixels. In still another method in which pixels in the vertical direction are considered, the pixel of interest is replaced by the pixel immediately above it or by the mean value of the pixels immediately above and below it.

The signal processing section 5 includes a YC separation circuit, a luminance signal processing section, a color signal processing section and other components which are not shown in FIGS. 1 and 2. The same section 5 separates the image signal subjected to defect correction into a luminance signal (data) and color signal (data) with the YC separation circuit. Then, the luminance signal undergoes predetermined signal processing by the luminance signal processing section. The color signal undergoes predetermined signal processing by the color signal processing section.

The luminance signal processing section handles various types of image processing including vertical and horizontal contour correction and γ (gamma) correction of the Y (luminance) signal.

The color signal processing section handles processing including removal of noise and false color from the color signal, RGB matrix processing, white balance adjustment in which RGB factors are changed, γ (gamma) correction, R-G/B-G conversion, color difference signal (Cr/Cb) generation and hue/gain adjustment.

The signal processing section 5 is supplied with color difference signals R-Y and B-Y from the color signal processing section. The same section 5 is also supplied with a luminance signal Y from the luminance signal processing section. The same section 5 adds a synchronizing signal to the above signals to output an analog composite signal. In addition to the analog composite signal, the same section 5 also outputs an analog component signal, a digital component signal and other signals.

The imaging system 100 illustrated in FIG. 1 will be described next. The lens 1 forms the image of a subject not shown in FIG. 1 on the imaging surface of the imaging device of the image sensor ADC 2. The image formed on the imaging surface of the solid-state imaging device is converted into an electric signal on a pixel-by-pixel basis and supplied, as an imaging signal, to the S/H & AGC circuit which is not shown in FIG. 1.

The S/H & AGC circuit samples and holds the imaging signal from the solid-state imaging device to extract necessary data. At the same time, the S/H & AGC circuit regulates the gain of the imaging signal to adjust it to a proper level. After the gain control, the output signal of the S/H & AGC circuit is supplied to the A/D converter.

The A/D converter converts the analog signal into digital form. The black level of the imaging signal in digital form is clamped by the clamp circuit 3 at a predetermined voltage level. Then, the resultant signal is supplied to the digital signal processing section 10.

The digital data from the clamp circuit 3 is supplied to the defect detection/correction circuit 4 (4A and 4B) of the digital signal processing section 10.

The defect detection/correction circuit 4 or the controller 30 has a timer for timing purposes. The timer is set when a static defect correction is performed at the time of or after the shipment. The timer is set, for example, to count the time when pixel defect correction is to be performed next time. When the set time comes, pixel defect correction will be automatically performed. Alternatively and in addition to the above, information is issued externally by an audio or visual prompt via the controller 30 that the user can adjust the imaging system 100.

In the pixel defect correction, a defective pixel count is calculated first from a defect rate calculated in advance for the elapsed time set with the timer. Further, a permissible pixel count is added to the calculated defective pixel count to set a threshold value.

Next, the threshold value is compared with the defective pixel count detected by the defect detection section 4B to determine whether the correction for the elapsed time is appropriate or it is an overcorrection.

After overcorrection control by the overcorrection calculation section 50 of the defect detection section 4B which will be described later, a correction pulse is generated based on defective pixel address data. This correction pulse is supplied to the defect correction section 4A for correction of defective pixels.

Based on defect information from the controller 30, a correction pulse is supplied to the defect correction section 4A of the defect detection/correction circuit 4, thus allowing defective pixels to be corrected.

Defective pixels are corrected by correcting pixel values by one of the publicly known interpolation methods. In one of the methods, the pixel of interest is replaced by the immediately preceding pixel or the pixel before the immediately preceding pixel in real time. In another method, the pixel of interest is replaced by the mean value of the immediately preceding and succeeding pixels. In still another method in which pixels in the vertical direction are considered, the pixel of interest is replaced by the pixel immediately above it or by the mean value of the pixels immediately above and below it.

A properly corrected image signal undergoes YC separation by the signal processing section 5 first followed by predetermined signal processing by the luminance signal processing section, the color signal processing section and other components. Then, the encoder 12 encodes the color difference signals R-Y and B-Y and the luminance signal Y and adds a synchronizing signal to the resultant signal to output an analog composite signal.

Next, FIG. 2 illustrates a block configuration of the digital signal processing section 10 in an embodiment of the present invention. The digital signal processing section 10 includes the defect detection/correction circuit 4, the signal processing section 5 and other components. The defect detection/correction circuit 4 includes the defect correction section 4A and the defect detection section 4B. The signal processing section 5 includes the signal processing circuit 11 and the encoder 12.

In the defect correction section 4A, defective pixels are corrected by correcting pixel values by one of the publicly known interpolation methods. In one of the methods, the pixel of interest is replaced by the immediately preceding pixel or the pixel before the immediately preceding pixel in real time. In another method, the pixel of interest is replaced by the mean value of the immediately preceding and succeeding pixels. In still another method in which pixels in the vertical direction are considered, the pixel of interest is replaced by the pixel immediately above it or by the mean value of the pixels immediately above and below it.

Next, the defect detection section 4B will be described. As illustrated in FIG. 2, the defect detection section 4B includes, for example, a comparator 21, an address detection circuit 22, a RAM (Random Access Memory) 23, a counter 24, a level setting circuit 25, the overcorrection calculation section 50, the correction pulse generation circuit 27 and other components. Part of the overcorrection calculation section 50 may be provided in the controller 30 and configured, for example, with software.

The comparator 21 compares the output level of the CCD (or CMOS) image sensor ADC 2 in frame readout mode, with a predetermined level (value set with the level setting circuit 25) to detect defective pixels.

The address detection circuit 22 identifies defective pixel addresses based on the detection output of the comparator 21 and converts this frame-read address into a field-read address.

The RAM 23 is provided to hold detection results of defective pixels in the form of address data. The RAM 23 stores address data from the address detection circuit 22 on a field-by-field basis for odd- and even-numbered fields.

The counter 24 successively measures the number of defective pixels whose amplitude is detected to be equal to or exceed a predetermined level by the comparator 21.

The level setting circuit 25 sets a pixel level used to determine defective pixels.

The overcorrection calculation section 50 determines a defective pixel correction count, for example, by calculating a defect rate, measuring the operating time and setting an overcorrection determination threshold value. The overcorrection calculation section 50 will be described later.

The correction pulse generation circuit 27 generates a control signal to correct overcorrected pixels in response to a control signal from the overcorrection calculation section 50 and supplies the control signal to the defect correction section 4A.

Following YC separation, the signal processing circuit 11 handles contour correction, γ (gamma) correction and other processing of the luminance signal. The same circuit 11 handles, for example, white balance adjustment and matrix processing of the color signal to generate color difference signals.

The encoder 12 is supplied with a luminance signal processed by the luminance signal processing section and a color signal processed by the color signal processing section. The encoder 12 adds a synchronizing signal to these signals and outputs, for example, a composite signal.

The imaging system (camera apparatus) 100 illustrated in FIG. 1 will be described next with reference to FIG. 2. When the imaging system 100 configured as described above is started, the timer built into the controller 30 or provided in the overcorrection calculation section 50 of the digital signal processing section 10 is set. Once set, the timer starts counting the operating time of the imaging system 100.

When the set time elapses, the defect detection/correction circuit 4 activates the overcorrection suppression function under the control of the controller 30. An image signal is supplied to the defect detection/correction circuit 4 from the clamp circuit 3. The comparator 21 of the defect detection/correction circuit 4 compares the image signal level with a predetermined reference signal level. When the image signal level is smaller than the reference signal level, no output signal such as pulse is output to the counter 24. That is, the counter 24 does not count the number of defective pixels. Further, the address detection circuit 22 does not detect address data of defective pixels. As a result, no address data is output to the RAM 23.

On the other hand, if the image signal level is found to be greater than the reference signal level by the comparator 21, an output signal such as pulse is supplied to the counter 24, causing the counter 24 to count the number of defective pixels. At the same time, the address detection circuit 22 detects address data of defective pixels. This address data is output to the RAM 23 for storage.

The overcorrection calculation section 50 calculates the defect count based on the pixel defect rate at the user-set time or the time set in advance. This defect rate is determined, for example, from past statistical data relating to defective pixels. This defect rate is stored, for example, in a storage device of the controller 30.

The defective pixel count obtained by the counter 24 is compared with the estimated defective pixel count (threshold value) calculated by the overcorrection calculation section 50. This determines whether the defect correction is an overcorrection, namely, whether more pixels were corrected than the calculated number of defective pixels to be corrected.

When the defect correction is not an overcorrection, no further correction will be made. On the other hand, if it is found that more pixels were corrected than the calculated number of defective pixels to be corrected, information about defect correction and readjustment (defect information) is issued via the controller 30, thus calling the user's attention. In response to this information, the user will proceed with adjustment or repair of the imaging system.

Further, in the case of overcorrection, the iris in the lens 1 is automatically adjusted via the controller 30. In this adjustment, the solid-state imaging device (element) of the image sensor ADC 2 is blocked from light to measure the black level and detect white defects. Then, overcorrection is readjusted to achieve self-recovery.

As another readjustment method, the defect detection and correction may be readjusted automatically using the motion detection function during an interval (period) free from moving objects.

As still another readjustment method, the defect detection and correction may be readjusted during a mute period of video output signal such as mode transition period.

Figure 3:
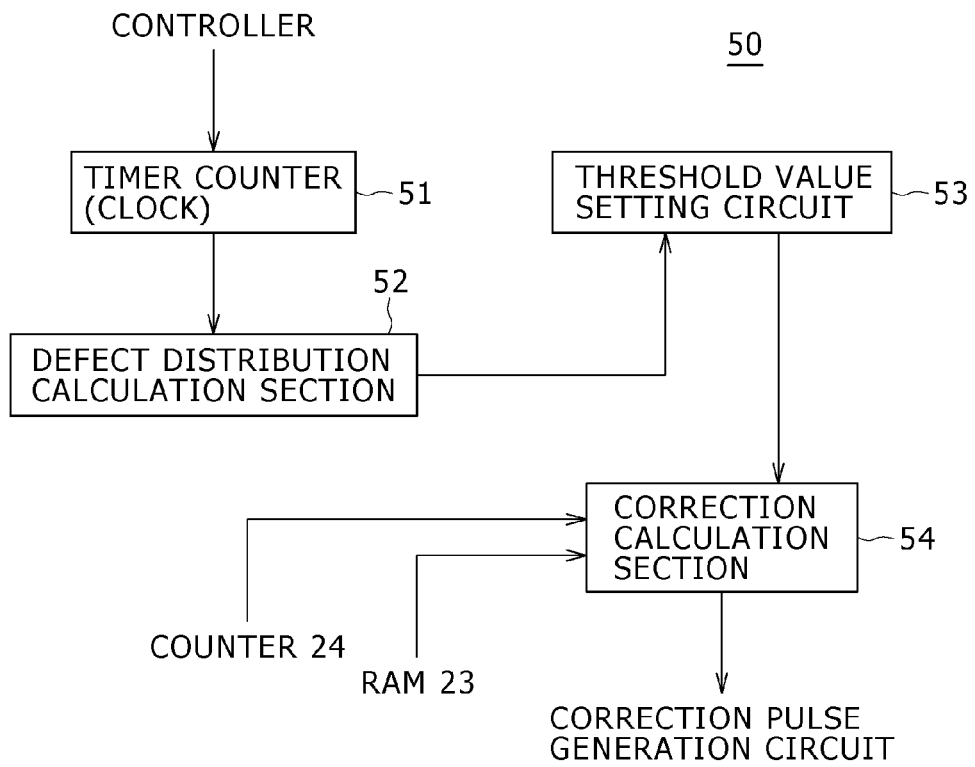
FIG. 3 is a block configuration diagram of a defect detection/correction circuit illustrated in FIG. 2.

The overcorrection calculation section 50 of the pixel defect correction device illustrated in FIG. 3 will be described next. The overcorrection calculation section 50 includes a timer counter (timing section) 51, a defect distribution calculation section 52, a threshold value setting circuit 53 and a correction calculation section 54. It should be noted that each of these functional blocks can be implemented not only with hardware but also with the controller 30 illustrated in FIG. 1. In particular, the microcomputer's clock may serve as the timer counter 51. The operating time of the imaging system 100 can be stored, for example, in the RAM incorporated in the controller 30. Here, a description will be made of a case where the overcorrection calculation section 50 is configured with hardware.

The timer counter 51 measures the operating time of the imaging system 100 by a control signal form the controller 30.

When the operating time measured by the timer counter 51 reaches a set time, operating time information is supplied to the defect distribution calculation section 52.

The defect distribution calculation section 52 calculates a defective pixel count for the operating time based on the defect rate and the pixel count of the image sensor ADC 2. The defect rate is known to increase in a linear function of operating time. The timer is reset to measure the operating time again when the imaging system 100 is readjusted, for example, by the user at the time of or after the shipment.

Figure 4:
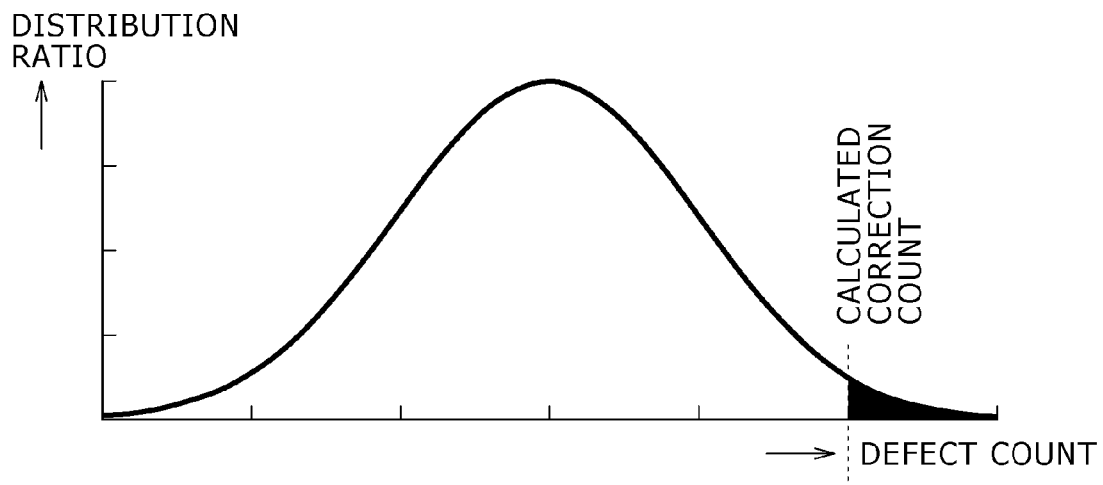
FIG. 4 is a distribution diagram illustrating a calculated defect distribution.

A statistical distribution curve of the defect rate is generally a Gaussian distribution curve as illustrated in FIG. 4. The curve plots the distribution ratio in arbitrary unit on the vertical axis versus the defect count on the horizontal axis.

The threshold value setting circuit 53 sets a pixel count as an overcorrection threshold value. This pixel count is obtained by adding a permissible count to the defective pixel count for the operating time supplied from the defect distribution calculation section 52. This permissible level is set according to the operating conditions of the imaging system 100 including the location and temperature. Setting a threshold value for determination of overcorrection makes it possible to properly restrict overcorrection of defects.

The correction calculation section 54 is supplied with an overcorrection threshold value from the threshold value setting circuit 53 and a defective pixel count and addresses of the defective pixels from the counter 24 and the RAM 23. The defective pixel count is compared with the overcorrection threshold value to determine whether overcorrection has occurred. If so, a control signal is output to the overcorrection calculation section 50 to prevent overcorrection. At the same time, a control signal is output via the controller 30 to suppress overcorrection.

On the other hand, if it is determined that overcorrection has not occurred, normal image defect correction is maintained.

The operation of the overcorrection calculation section 50 will be described next. When a predetermined operating time, set with the timer counter 51 at the time of shipment or previous adjustment of the imaging system 100, elapses, the defective pixel count generally increases proportionally to the operating time. Therefore, the defective pixel count can be estimated from a statistical distribution. A defective pixel count measured by the counter 24 is compared with an overcorrection threshold value. This threshold value takes into account the defective pixel count estimated by statistical processing and a permissible defective pixel count. When the defective pixel count measured by the counter 24 is smaller than the overcorrection threshold value, this means that adjustment has been made properly. Therefore, the overcorrection calculation section 50 outputs no control signal to the correction pulse generation circuit 27 to suppress overcorrection. At this time, normal correction is carried out by the defect correction section 4A. Therefore, no adjustment for overcorrection will be made.

On the other hand, the defective pixel count is measured by counter 24 after the elapse of the operating time set in the timing section (timer counter 51) by the user or administrator. If the defective pixel count is detected to be greater than the overcorrection threshold value by the comparator 21, dynamic overcorrection may have been carried out. That is, if it is found that erroneous detection has occurred, the imaging system 100 is panned or tilted. That is, the system is moved horizontally or vertically to move its imaging region. If the signal level of pixels to be corrected changes with change in the subject when the imaging region is moved, it is determined that the pixels have been erroneously detected. If there is no change in signal level, it is determined that the pixels are defective. Thus, erroneously detected pixels can be identified. This makes it possible to remove such pixels from those pixels to be checked for defect, thus suppressing overcorrection.

A possible method of suppressing overcorrection is static correction control. For example, if the secondary defect count is estimated to be greater than the overcorrection threshold value, the overcorrection calculation section 50 supplies a control signal to the controller 30. In response, the controller 30 controls the iris mechanism of the lens 1 to block the solid-state imaging device (element) of the image sensor ADC 2 from light. Then, the black level of each of the pixels of the solid-state imaging device (element) is measured. If the measured black level is greater than a predetermined level by a given level or more, the pixel of interest is determined to have a white defect. The detected defective pixels are readjusted for automatic self-recovery.

As an alternative method of static overcorrection control, defect detection and correction can be readjusted, for example, during a mute period of video output signal. That is, readjustment can be achieved by supplying an iris control signal to the iris control mechanism of the lens 1 from the controller 30 so as to automatically block the solid-state imaging device (element) of the image sensor ADC 2 from light.

As another overcorrection control method, defect detection and correction may be readjusted using the motion detection function of the imaging system 100 during a period free from moving objects. This prevents moving objects from being overlooked, thus ensuring proper defect correction at all times.

In addition to automatic overcorrection control, on the other hand, issuing information to external equipment to prompt the readjustment makes it possible for the administrator to readjust the imaging system 100. For example, if, as a result of comparison of a defect count measured by the overcorrection calculation section 50 in a predetermined operating time with an overcorrection threshold value estimated by statistical processing for the operating time, the defect count is greater than the threshold value, the overcorrection calculation section 50 outputs a control signal to the controller 30 via an interface.

The controller 30 transfers the control signal to a display device of the imaging system 100 which is not shown. As a result, a message indicating that defect correction may be required appears on this display section. If the administrator can readjust the defect detection and correction from external equipment after seeing the message, he or she will do so at a proper time to maintain the imaging system 100 corrected properly at all times.

Figure 5:
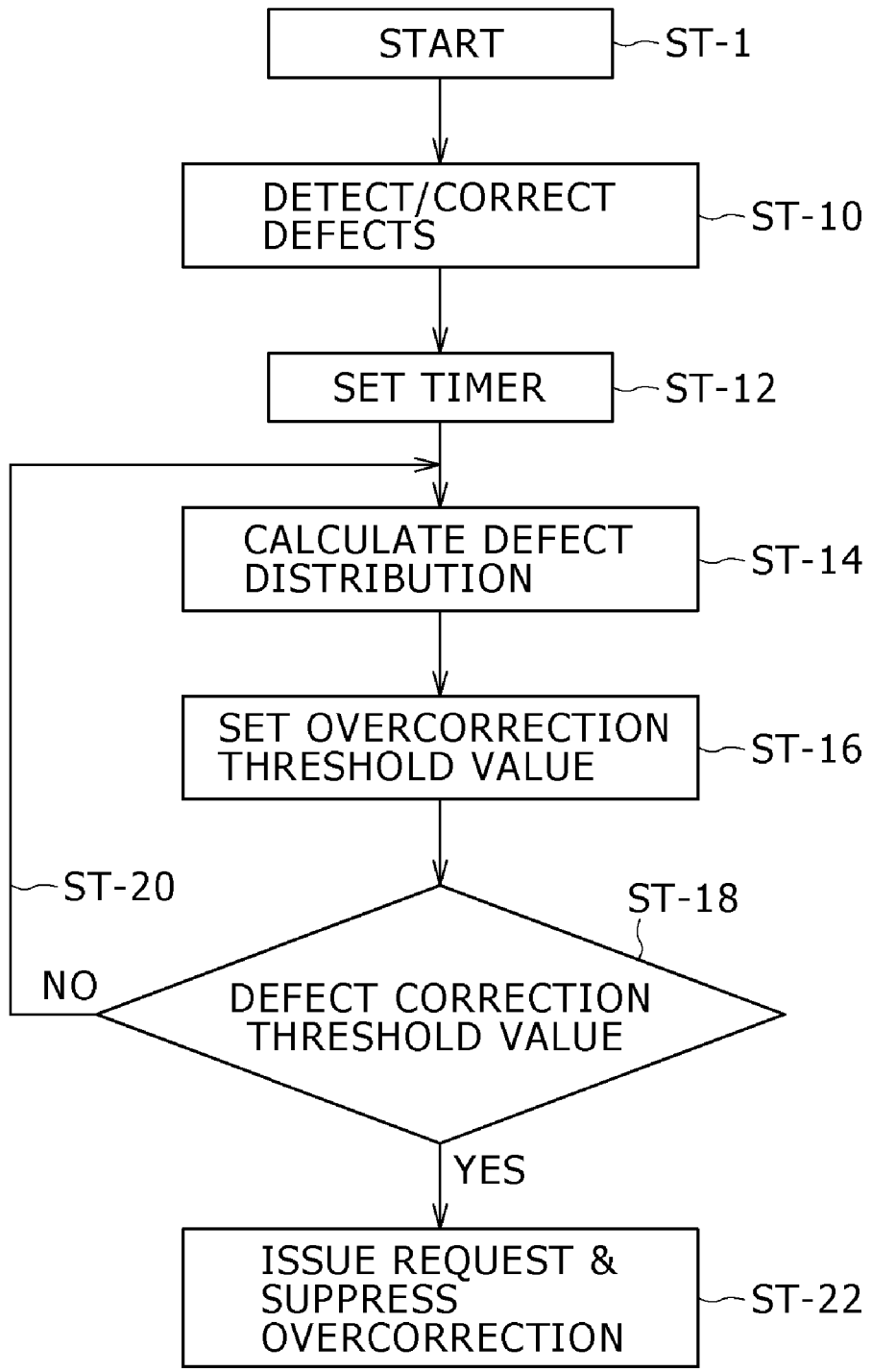
FIG. 5 is a flowchart for describing the operation of the imaging system.

Next, FIG. 5 illustrates a flowchart for readjusting the overcorrection of the imaging system 100.

In step ST-10, pixel defect correction is performed at the time of or after the shipment. This pixel defect correction may be static or dynamic.

In step ST-12, the time information resulting from the defect correction in step ST-10 is stored in the timer counter of the controller 30 or that of the overcorrection calculation section 50. At the same time, the timer counter is set so that defect correction can be performed in a given operating time.

In step ST-14, when the given operating time of the imaging system 100 elapses, the controller 30 issues an instruction. In response to this instruction, a pixel defect rate of the solid-state imaging device of the image sensor ADC 2 is estimated for this operating time from statistical distribution. Based on the estimated ratio, the defective pixel count is calculated in the total pixel count of the solid-state imaging device of the image sensor ADC 2.

In step ST-16, an overcorrection threshold value (defective pixel count) is found from the estimated defect count. The threshold value takes into account a permissible count.

In step ST-18, the defective pixel count is compared with the estimated overcorrection threshold value.

If the defect correction is determined to be an overcorrection because the defective pixel count is greater than the estimated threshold value in step ST-18, overcorrection will be suppressed. Alternatively, the controller 30 will issue a request for defective pixel correction so that the administrator can readjust the imaging system (step ST-22).

When the defect correction is determined not to be an overcorrection because the defective pixel count is smaller than the estimated threshold value in step ST-18, control returns to step ST-14 (step ST-20). Thereafter, the same process steps will be repeated.

As described above, the defect detection/correction circuit and imaging system calculate an appropriate defective pixel count over time, thus suppressing overcorrection. The pixel defect rate varies depending on the installation location of the imaging system. However, use of a defect rate and a threshold value for overcorrection determination makes it possible to suppress overcorrection properly according to the location of use. Further, a request is issued to external equipment to readjust overcorrection, thus permitting readjustment.

Next, the defect correction not affecting the on-screen image will be described with reference to FIG. 6. An imaging system illustrated in FIG. 6 includes some additional functional blocks as compared to the imaging system 100 illustrated in FIG. 1.

The digital signal processing section 10 further includes a stability detection circuit 13. In addition, a memory 20 and an external sensor 40 have been added as part of the system.

Hereinafter, the description of the same blocks as those in FIG. 1 will be omitted, and the blocks different therefrom will be described.

The stability detection circuit 13 is connected to the signal processing section 5 of the digital signal processing section 10 and to the controller 30. The stability detection circuit 13 includes a luminance integration circuit, color integration circuit, motion detection circuit and other circuitry. The luminance integration circuit integrates a luminance signal from the signal processing section 5. The color integration circuit integrates a color signal from the same section 5. The motion detection circuit detects a subject motion by detecting the subject position from one field or frame to the next based on the image from the same section 5.

The memory 20 is connected between the input and output of the signal processing section 5 of the digital signal processing section 10. The memory 20 stores image data from the same section 5. The memory 20 supplies stored image data to the same section 5 at a predetermined timing in response to a control signal from the controller 30. For example, the memory 20 outputs image data or a given image to the display device during a correction period.

The controller 30 detects and controls a subject obtained by the external sensor 40. In addition, the controller 30 is supplied with detection information from the motion detection circuit and motion information from the luminance and color integration circuits. If the detection information indicates that there are no moving objects or if the motion information indicates that there is no motion of luminance or color component, the controller 30 controls the lens 1, the defect detection/correction circuit 4 and the signal processing section 5. Further, the controller 30 exchanges data with the defect detection/correction circuit 4, the signal processing section 5 and the stability detection circuit 13 of the digital signal processing section 10 and the external sensor 40 to control these circuits and component based on the data.

The external sensor 40 includes, for example, an ultrasonic, infrared or CCD sensor. The same sensor 40 senses the presence or absence of a subject in front of the imaging system and supplies the sensing result to the controller 30.

Next, the operation of the imaging system 100A illustrated in FIG. 6 will be described. The lens 1 forms the subject image on the imaging surface of the image sensor ADC 2. The image is converted into an electric signal on a pixel-by-pixel basis and output as an imaging signal. After sampling and holding, the analog signal is converted into a digital signal by the A/D converter. The digital imaging signal is clamped by the clamp circuit 3 at a predetermined voltage level. Then, the resultant signal is supplied to the digital signal processing section 10. On the other hand, digital data from the clamp circuit 3 is supplied to the defect detection/correction circuit 4 of the digital signal processing section 10.

The defect detection/correction circuit 4 or the controller 30 has a timer for timing purposes. The timer is set when a static defect correction is performed at the time of or after the shipment. The timer is set, for example, to count the time when pixel defect correction is to be performed next time. When the set time comes, pixel defect correction will be automatically performed. Alternatively and in addition to the above, information is issued externally by an audio or visual prompt via the controller 30 so that the user can adjust the imaging system 10A.

Next, the defect detection and correction operation will be described. This operation is readjusted at different timings (and periods). Readjustment thereof is accomplished by detecting a period when the on-screen image will not be affected, blocking the CCD device from light with a mechanical iris or other light blocking mechanism during that period and detecting and correcting defective pixels statically during that light blocking period.

More specifically, there are three defect detection and correction timings (and periods). The first timing and period are when there is no change in video signal with no need to record the video signal continuously. The second timing and period are when video may not be continuously obtained as during a mode transition or mute period. The third timing and period are when video is kept static as during loading of still image.

Firstly, a case will be described where defective pixels are detected and corrected during a period when there is no change in video signal with no need to record the video signal continuously.

Luminance and color signals from the signal processing section 5 are supplied to the stability detection circuit 13

(luminance integration, color integration and motion detection circuits). The luminance signal is integrated by the luminance integration circuit. The color signal is integrated by the color integration circuit which is an OPD (optical detector). A period is detected when there is no change in the integrated values of the luminance and color signals. Motion information during this period is supplied to the controller 30. The controller 30 considers, as a correction period, a period free from motion of luminance or color signal and outputs a control signal to the defect detection/correction circuit 4 and the signal processing section 5.

On the other hand, if, as a result of detection by the motion detection circuit, there are no moving objects, the controller 30 outputs a control signal for defect correction to the defect detection/correction circuit 4 and the signal processing section 5.

Alternatively, the controller 30 detects the subject obtained by the external sensor 40. When determining that there are no targets to be imaged, the controller 30 outputs a control signal to the defect detection/correction circuit 4 and the signal processing section 5 to initiate correction control.

Secondly, a case will be described where defective pixels are detected and corrected during a period when video may not be continuously obtained as during a mode transition or mute period.

Upon detection of the activation of the pixel count change mode available with the imaging system 10A, the controller 30 outputs a control signal to the defect detection/correction circuit 4 and the signal processing section 5, thus initiating correction control.

Further, the mute operation starts when the format is switched between JPEG (Joint Photographic Experts Group) and MPEG (Motion Picture Experts Group) or when the broadcasting system is switched between NTSC (National Television System Committee), PAL (Phase Alternation by Line Color Television) and SECAM (Sequential Couleur a Memoire). In addition to the above, the mute function is activated when video display is not desired so that the display screen is switched to monochrome (e.g., black, blue).

When the mute operation is activated, the controller 30 detects the activation or start timing of the operation and outputs a control signal to the defect detection/correction circuit 4 and the signal processing section 5. This causes the same circuit 4 to initiate the defect correction operation.

Thirdly, a case will be described where defective pixels are detected and corrected during a period when video is kept static as during loading of still image.

During loading of a still image, an integrated value of luminance or color signal does not indicate any motion of the subject. Therefore, the status of the loaded image is detected. Then, the motion information obtained therefrom is supplied to the controller 30. The controller 30 considers, as a pixel defect correction period, a period during which video is kept static as during loading of still image, and outputs a control signal to the defect detection/correction circuit 4 and the signal processing section 5. Alternatively, if it is found, as a result of detection of the (still) image by the motion detection circuit, that there are no moving objects, the controller 30 outputs a control signal to the defect detection/correction circuit 4 and the signal processing section 5. This initiates the defect detection and correction operation of the same circuits 4 and 5.

When any of the above three detect detection and correction timings (and periods) comes, the controller 30 supplies an iris control signal to the iris mechanism of the lens 1, thus blocking the solid-state imaging device of the image sensor ADC 2 from light. When the solid-state imaging device is blocked from light, the image sensor ADC 2 supplies pixel data of its imaging device to the defect detection/correction circuit 4 via the clamp circuit 3. The defect detection/correction circuit 4 detects the output level of all pixels. Based on this detection result, defective pixels and their addresses are identified.

In the pixel defect detection and correction operation, a defective pixel count (defect count) is calculated first based on the defect rate calculated in advance for the elapsed time set by the timer. Further, a threshold value is set which is obtained by adding a permissible pixel count to the calculated defective pixel count (calculated correction count).

Next, the threshold value is compared with the defective pixel count detected by the defect detection section 4B to determine whether the correction is appropriate for the elapsed time or an overcorrection.

Overcorrection control is performed on the defective pixels by the overcorrection calculation section 50 of the defect detection section 4B which will be described later. Then, a correction pulse is generated based on the address data of the defective pixels. This correction pulse is supplied to the defect correction section 4A for correction of the defective pixels.

Based on defect information from the controller 30, a correction pulse is supplied to the defect correction section 4A of the defect detection/correction circuit 4 for correction of the defective pixels.

Defective pixels are corrected by correcting pixel values by one of the publicly known interpolation methods. In one of the methods, the pixel of interest is replaced by the immediately preceding pixel or the pixel before the immediately preceding pixel in real time. In another method, the pixel of interest is replaced by the mean value of the immediately preceding and succeeding pixels. In still another method in which pixels in the vertical direction are considered, the pixel of interest is replaced by the pixel immediately above it or by the mean value of the pixels immediately above and below it.

The video display operation during a defect correction period will be described next.

When the controller 30 supplies a control signal for defect detection and correction to the signal processing section 5, a timing and period are set at which to interpolate a video signal from the signal processing section 5. At the same time, the video signal from the signal processing section 5 is stored in the memory 20. The image data stored in the memory 20 during a defect correction period is read and output to the display device via the signal processing section 5. That is, only the image before correction output from the memory 20 is displayed during this defect detection and correction period. Thus, the image being corrected is not displayed.

This ensures that no corrupted video signal from the signal processing section 5 is displayed, thereby allowing for correction without causing any discomfort to the user.

Figure 7:
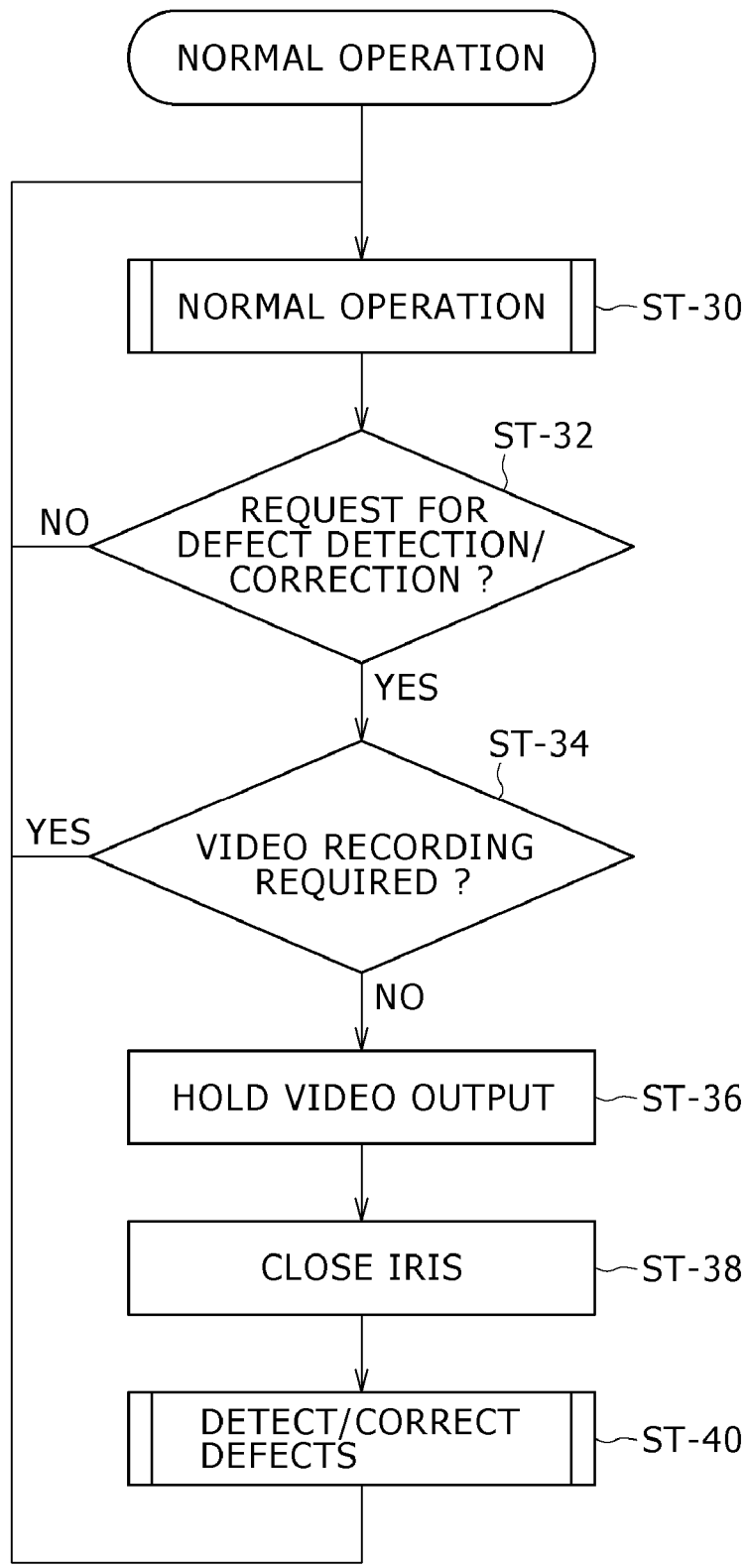
FIG. 7 is a flowchart for describing the operation of the imaging system illustrated in FIG. 6.

Next, FIG. 7 illustrates a flowchart for describing the static defect detection and correction operation during normal operation of the imaging system 10A.

In step ST-30, a pixel defect correction is performed at the time of or after the shipment, followed by normal operation. We assume that this pixel defect correction is a static correction.

After the defect correction, time information is stored in the timer counter of the controller 30 or that of the overcorrection calculation section 50. This allows a defect correction to be performed automatically in a predetermined operating time.

In step ST-32, it is determined whether the overcorrection calculation section 50 has made a request for defect detection and correction operation. If no request has been made, no correction will be performed. In this case, the camera will continue, for example, its monitoring operation.

Alternatively, a request may be made by external equipment rather than the overcorrection calculation section 50. More specifically, a request can be made for defect detection and correction operation according to a control program by transferring commands to the control section such as CPU (microcomputer) by key operation. Further, a defect correction request signal can be generated by pressing the control button so as to operate the hardware.

In step ST-34, when a request is made for defect detection and correction operation after the time set by the timer counter elapses, it is determined whether video recording may be required. If so, no defect correction will be performed. That is, a defect detection and correction timing is detected.

In step ST-36, when video recording is not required, video output is held in the memory 20. At the same time, the controller 30 supplies a control signal to the iris mechanism of the lens 1.

During this period, a video (image) signal is output from the memory 20 via the digital signal processing section 10. No video (image) being corrected is displayed.

In step ST-38, the iris is controlled so that the light receiving section of the solid-state imaging device in the image sensor ADC 2 is blocked from light.

In step ST-40, the pixel signal, output from the solid-state imaging device with its light receiving section blocked from light, is converted into a digital signal. The signal is then subjected to clamping and other processing before being supplied to the defect detection/correction circuit 4. Defects are detected and then corrected by the same circuit 4 using defect data. This defect correction is carried out, for example, according to the process steps ST-14 to ST-22 in the flowchart of FIG. 5.

As described above, a defect detection and correction operation is carried out when video recording is not required during normal operation. This ensures that the display image is not affected by the detection and correction operation.

FIG. 8 illustrates a flowchart for describing the static defect detection and correction of the imaging system 100A during the mute or still operation for a mode transition.

A description will be made about the defect detection and correction operation performed when the mute or still operation for a mode transition starts with the elapse of a predetermined time set by the timer counter.

In step ST-50, when a predetermined time set by the timer counter elapses, the defect detection and correction operation associated with the mute or still operation begins for a mode transition of the imaging system 10A.

In step ST-52, the controller 30 of the imaging system 100A supplies a control signal to each of the functional blocks. The controller 30 also supplies a control signal for defect detection and correction to the signal processing section 5. At the same time, the video signal output is held.

In step ST-54, the controller 30 determines whether a request has been made for defect detection and correction operation. This request is made automatically by the controller 30 when an operating time set by the timer counter of the imaging system 100A elapses as described above. Alternatively, the request is made by the user as he or she manipulates the control button provided on the imaging system 10A. It should be noted that means of making a request for defect detection and correction operation are not limited to the above.

In step ST-54, when a request is made for defect detection and correction, the defect detection and correction timing is detected. For example, it is detected whether the mute or still operation is on for a mode transition during the operation of the imaging system 10A. When the mute or still operation is on, the controller 30 supplies a control signal to the iris mechanism of the lens 1, thus closing the iris. This blocks the light receiving section of the solid-state imaging device in the image sensor ADC 2 from light (ST-56).

In step ST-58, a pixel defect rate of the solid-state imaging device (element) of the image sensor ADC 2 is estimated for the operating time of the imaging system 100A from statistical distribution. Based on the estimated ratio, the defective pixel count (defect count) is calculated in the total pixel count of the solid-state imaging device of the image sensor ADC 2. Based on the calculated defective pixel count (calculated correction count), a threshold value is found which takes into account a permissible pixel count. Then, the defective pixel count is compared with the estimated threshold value. When the defective pixel count is smaller than the estimated threshold value, there is no overcorrection. Therefore, normal correction will be performed. In the case of overcorrection because of the defective pixel count greater than the estimated threshold value, overcorrection will be suppressed.

Figure 6:
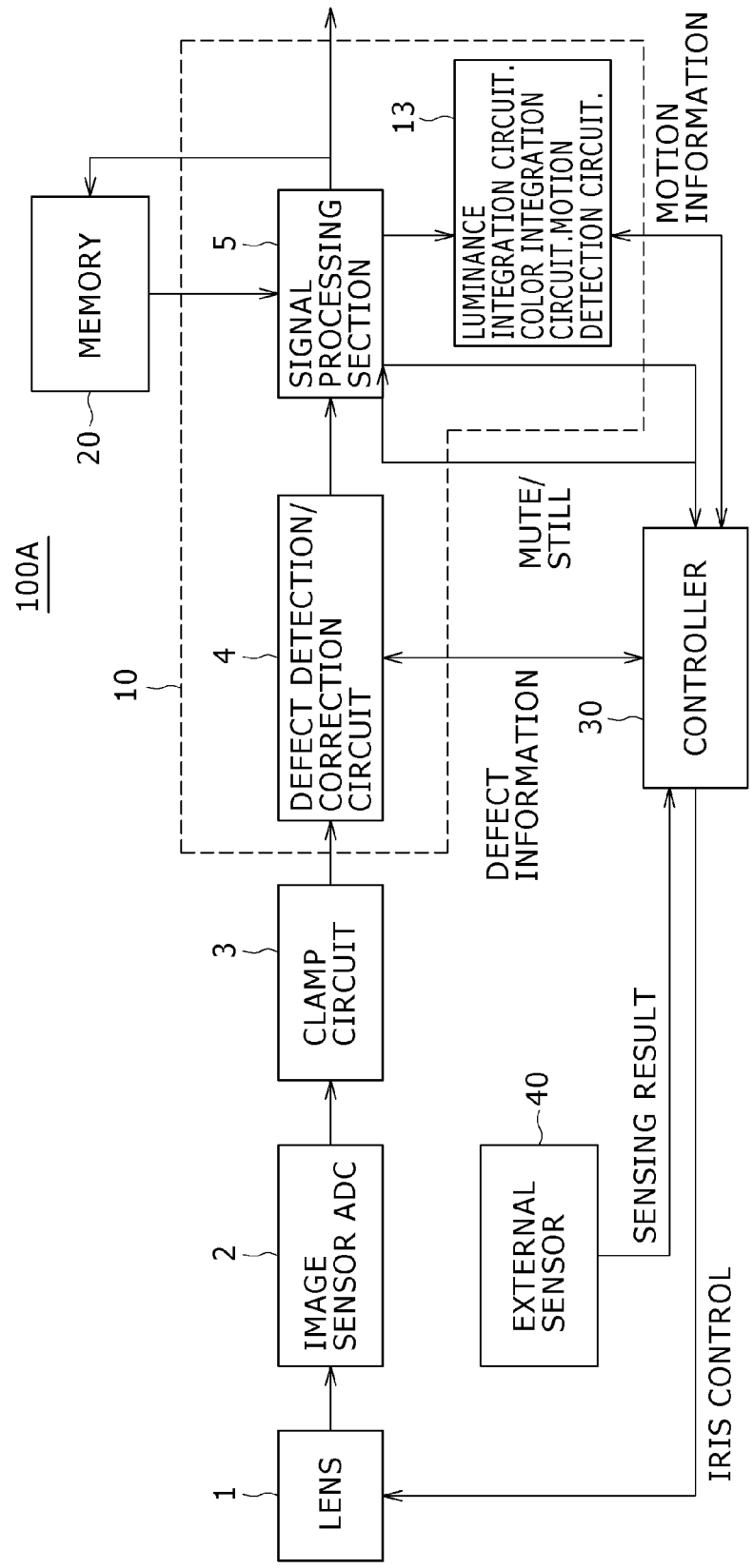
FIG. 6 is a block configuration diagram of the imaging system.

On the other hand, during pixel defect correction, image data stored in the memory 20 of FIG. 6 is displayed. This ensures that the on-screen image is not affected by the defect detection and correction operation.

In step ST-60, when there is no request for defect detection and correction or when the defect detection and correction operation in step ST-58 is terminated, the mode transition operation is performed. The mode transition operation is terminated at the completion of predetermined operation (step ST-62).

As described above, the defect detection and correction operation is performed during a period when no video recording is required, when video may not be recorded continuously or when video is kept static. This ensures proper defect correction at all times while at the same time preventing loss of video signal.

Further, video during the defect detection and correction operation during which light is blocked is interpolated using a memory. This allows for static defect detection and correction without causing any discomfort to the user during the operation of the imaging system.

Although a defective pixel detection and correction operation using a statistical method has been described in FIGS. 7 and 8, the present invention is also applicable to a normal defect detection and correction operation which does not employ any statistical defect correction.

As described above, the defect detection/correction circuit and imaging system of the present invention rely on static defect detection and correction to calculate an appropriate defective pixel count over time, thus suppressing overcorrection. The pixel defect rate varies depending on the installation location of the imaging system. However, use of a defect rate and threshold value for overcorrection determination makes it possible to suppress overcorrection properly according to the location of use.

Further, static defect detection and correction operation is performed during a mode transition period such as during the mute or still operation. This ensures proper defect correction at all times while at the same time preventing loss of video signal.

Still further, even if the imaging system is installed where readjustment is difficult, it can be readjusted at a proper time thanks to issuance of information. Once installed, the imaging system does not require readjustment of its defect detection and correction. The imaging equipment is capable of self-recovery by itself.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging system comprising:
    an imaging device;
    light blocking means for blocking a light receiving section of the imaging device from light;
    a pixel defect correction section configured to detect and correct defective pixels of the imaging device;
    a signal processing section configured to process a pixel signal corrected by the pixel defect correction section; and
    control means for controlling the signal processing section and the light blocking means according to information obtained by the pixel defect correction section;
    wherein the pixel defect correction section has timing means and measures an operating time with the timing means to estimate a secondary defect count.

2. The imaging system of claim 1, wherein
    the pixel defect correction section estimates a secondary defect count for an operating time based on a defect rate of the imaging device so as to restrict a correction count during defect correction in a normal imaging condition.

3. The imaging system of claim 1, wherein
    the pixel defect correction section estimates a secondary defect count for an operating time based on a defect rate of the imaging device, and
    if a defect candidate count is excessively large, the pixel defect correction section blocks light or moves an imaging region to identify overcorrected pixels so as to restrict a dynamic defect correction count in a normal imaging condition.

4. The imaging system of claim 1 comprising information issuance means, wherein
    the pixel defect correction section estimates a secondary defect count for an operating time based on a defect rate of the imaging device, and
    the information issuance means issue information to prompt the readjustment of defect detection and correction with light completely blocked or light of a given luminance admitted.

5. The imaging system of claim 4, wherein
    the pixel defect correction section estimates a secondary defect count for an operating time based on a defect rate of the imaging device, and
    if a defect candidate count is excessively large, the information issuance means determine that a system failure has occurred and issue information.

6. The imaging system of claim 1, wherein
    the pixel defect correction section estimates a secondary defect count for an operating time based on a defect rate of the imaging device, and
    the light blocking means automatically block the light receiving section from light to perform static defect detection and correction for self-recovery.

7. The imaging system of claim 1 comprising motion detection means, wherein
    the pixel defect correction section estimates a secondary defect count for an operating time based on a defect rate of the imaging device,
    if a defect candidate count is excessively large, the motion detection means detect an image motion, and
    the light blocking means automatically block the light receiving section from light during an interval free from moving objects to readjust static defect detection and correction.

* * * * *